(12) United States Patent
Okuda et al.

(10) Patent No.: US 9,027,688 B2
(45) Date of Patent: May 12, 2015

(54) REDUCING AGENT TANK AND WORK VEHICLE

(71) Applicant: Komatsu Ltd., Tokyo (JP)

(72) Inventors: Kozo Okuda, Hirakata (JP); Hideyuki Ohi, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/237,188

(22) PCT Filed: Sep. 27, 2013

(86) PCT No.: PCT/JP2013/076326
§ 371 (c)(1),
(2) Date: Feb. 5, 2014

(65) Prior Publication Data
US 2015/0090511 A1   Apr. 2, 2015

(51) Int. Cl.
*F01N 3/28* (2006.01)
*E02F 9/08* (2006.01)
*B60K 13/04* (2006.01)
*G01F 23/02* (2006.01)

(52) U.S. Cl.
CPC ............ *E02F 9/0883* (2013.01); *F01N 3/2896* (2013.01); *B60K 13/04* (2013.01); *G01F 23/02* (2013.01)

(58) Field of Classification Search
CPC . F01N 3/2066; F01N 2610/02; F01N 3/0814; F01N 3/08; B60K 13/04; G01F 23/02; G01F 23/0053; G01F 23/30; G01F 23/66; B01D 53/94; E02F 9/0883
USPC ...................................................... 180/89.2
See application file for complete search history.

(56) References Cited

U.S. PATENT DOCUMENTS

| 8,429,905 B2* | 4/2013 | Capelle et al. ................... 60/303 |
| 8,661,793 B2* | 3/2014 | Yamashita et al. .............. 60/295 |
| 8,695,827 B2* | 4/2014 | Klauer et al. ................. 220/86.2 |
| 2009/0188923 A1* | 7/2009 | Versaw et al. ................. 220/564 |

(Continued)

FOREIGN PATENT DOCUMENTS

| DE | 91 03 848 U1 | 6/1991 |
| DE | 195 44 593 A1 | 6/1997 |

(Continued)

OTHER PUBLICATIONS

The International Search Report for the corresponding international application No. PCT/JP2013/076326, issued on Dec. 17, 2013.

(Continued)

*Primary Examiner* — Paul N Dickson
*Assistant Examiner* — Timothy Wilhelm
(74) *Attorney, Agent, or Firm* — Global IP Counselors, LLP

(57) ABSTRACT

A reducing agent tank includes a tank body storing reducing agent and a cylindrical gauge member visually indicating a storage amount of the reducing agent inside the tank body. The gauge member is in communication with an inside of the tank body. The tank body has a replenishment port to replenish the reducing agent. The gauge member is provided on a first wall surface of a plurality of wall surfaces defining the tank body. The gauge member is provided in a slanted manner relative to a bottom plate of the tank body. The replenishing port and the gauge member are disposed in a row along a direction that extends along the first wall surface as seen in a plan view.

20 Claims, 9 Drawing Sheets

(56) References Cited

U.S. PATENT DOCUMENTS

2012/0067660 A1    3/2012    Kashu et al.
2012/0315196 A1*  12/2012  Maus et al. ............ 422/174

FOREIGN PATENT DOCUMENTS

| | | |
|---|---|---|
| DE | 197 15 600 A1 | 10/1998 |
| JP | 2009-167931 A | 7/2009 |
| JP | 2009-174418 A | 8/2009 |
| JP | 2011-132890 A | 7/2011 |
| JP | 2012-62693 A | 3/2012 |
| JP | 2012-237232 A | 12/2012 |
| WO | 2012/117753 A1 | 9/2012 |

OTHER PUBLICATIONS

The Office Action for the corresponding German application No. 11 2013 000 191.8, issued on Feb. 26, 2015.

* cited by examiner

REDUCING AGENT TANK AND WORK VEHICLE

CROSS-REFERENCE TO RELATED APPLICATIONS

This application is a U.S. National stage application of International Application No. PCT/JP2013/076326, filed on Sep. 27, 2013.

BACKGROUND

1. Field of the Invention

The present invention relates to a reducing agent tank and a work vehicle.

2. Background Information

A work vehicle equipped with a selective catalyst reduction device for treating exhaust gas from an engine has been proposed. A hydraulic excavator described in Japanese Patent Laid-open No. 2012-237232, for example, includes a selective catalyst reduction device and a reducing agent tank. The selective catalyst reduction device uses a reducing agent such as urea water to treat the exhaust gas. The reducing agent is stored in the reducing agent tank.

SUMMARY

When replenishing a reducing agent tank installed on a work vehicle with reducing agent, an operator normally performs the work of replenishing the reducing agent while looking downward toward the reducing agent tank. In order to prevent spilling by overfilling the reducing agent tank with the reducing agent, the work of replenishing is performed while visually confirming the amount of reducing agent inside the reducing agent tank. However, it is difficult to visually confirm how much reducing agent has been poured into the reducing agent tank from above the reducing agent tank.

An object of the present invention is to provide a reducing agent tank for which the amount of reducing agent inside the reducing agent tank may be visually confirmed in a simple manner when replenishing the reducing agent tank with the reducing agent.

A reducing agent tank according to a first aspect of the present invention is equipped with a tank body and a gauge member. The tank body stores reducing agent. The gauge member is in communication with the inside of the tank body. The gauge member is a cylindrical member for visually confirming a storage amount of the reducing agent inside the tank body. The gauge member is provided on a first wall surface among a plurality of wall surfaces that constitute the tank body, and is provided in a slanted manner with respect to a bottom plate of the tank body. Replenishment of the reducing agent is made possible from a replenishing port on the tank body. The replenishing port and the gauge member are disposed in a row in a direction along the first wall surface when seen in a plan view.

According to this configuration, the amount of reducing agent inside the tank body may be confirmed by looking at the liquid level of the reducing agent inside the gauge member since the gauge member communicates with the inside of the tank body. Since the gauge member is slanted with respect to the bottom plate, a liquid level position of the reducing agent inside the gauge member may be confirmed even when looking at the gauge member from above. As a result, the amount of reducing agent inside the reducing agent tank may be visually confirmed in a simple manner when replenishing the reducing agent. Since the replenishing port and the gauge member are disposed in a row in a direction along the first wall surface when seen in a plan view, the reducing agent may be replenished while visually confirming the amount of reducing agent from above.

The gauge member is preferably positioned in a center part of the first wall surface in the width direction. The replenishing port is positioned at an end part side of the tank body in the width direction of the first wall surface when seen in a plan view.

The reducing agent tank preferably is further provided with a guiding tube for guiding the reducing agent poured from the replenishing port into the tank body. The gauge member is provided in a manner that projects outward from the first wall surface. The guiding tube extends upward from an upper surface of the tank body and extends in the direction that the gauge member projects. According to this configuration, the operator performing the replenishing work is able to easily check the gauge member visually while performing the replenishing work.

An upper end of the gauge member is preferably positioned lower than an upper end of the tank body. According to this configuration, a space remains in an upper section inside the tank body even if the liquid level of the reducing agent reaches the upper end of the gauge member since a clearance is provided between the upper end of the tank body and the upper end of the gauge member. While the volume of the reducing agent increases when the reducing agent inside the reducing agent tank freezes in a cold district, damage to the tank body due to a volume expansion of the reducing agent may be prevented since the space inside the tank body is provided as described above.

The reducing agent tank preferably is provided with a floating member. The floating member is able to move in the length direction of the gauge member inside the gauge member and is able to float on the reducing agent. According to this configuration, the position of the liquid level of the reducing agent inside the gauge member may be visually confirmed with more certainty.

The gauge member is preferably slanted with respect to the bottom plate when seeing the first wall surface from the front.

A work vehicle according to a second aspect of the present invention is provided with any of the reducing agent tanks described above, and a work plate. The work plate is positioned outside of the first wall surface. The work plate is positioned higher than the gauge member and lower than the replenishing port.

According to this configuration, the operator is able to perform the work for replenishing the reducing agent tank with the reducing agent while standing on the work plate. Since the work plate is positioned higher than the gauge member of the reducing agent tank, the operator looks downward at the reducing agent tank when performing the replenishing work. However the operator is able to visually confirm in a simple manner the amount of the reducing agent inside the tank body as described above. Moreover, the replenishing work may be performed in a simple manner by placing a replenishment container filled with the reducing agent for replenishing on the work plate, and then tilting the replenishment container to pour the reducing agent into the tank body.

The reducing agent tank and the work plate are preferably disposed in a row when seen in a plan view.

The work vehicle is preferably further provided with a tank cover that is disposed above the reducing agent tank so as to cover the reducing agent tank. The tank cover and the work plate are formed in a step-like manner as a whole.

According to the present invention, a reducing agent tank may be provided for which the amount of reducing agent inside the reducing agent tank may be visually confirmed in a simple manner when replenishing the reducing agent tank with the reducing agent.

DETAILED DESCRIPTION OF EMBODIMENT(S)

Figure 1:
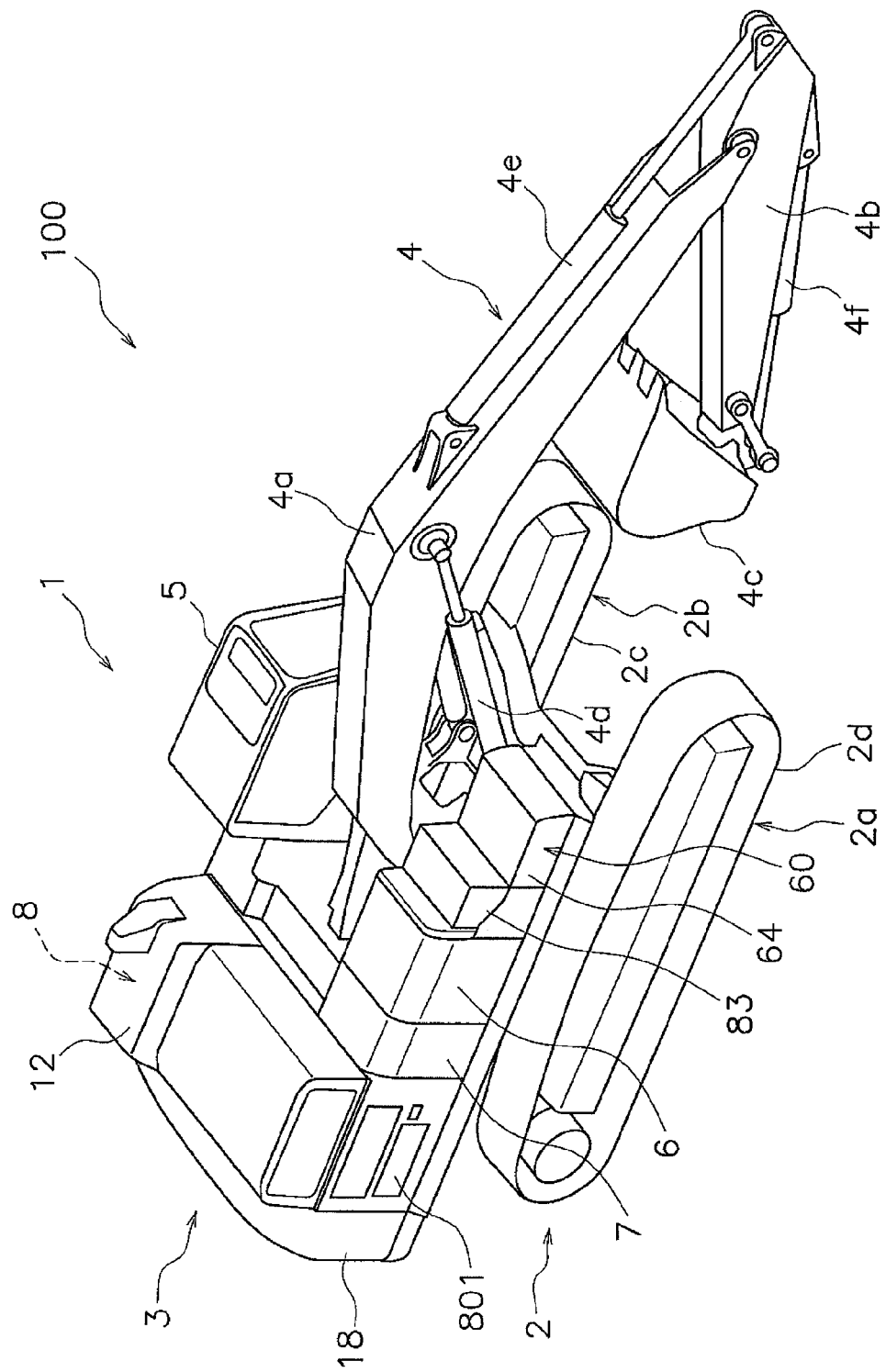
FIG. 1 is a perspective view of a hydraulic excavator.

A hydraulic excavator 100 according to an embodiment of the present invention shall be explained in detail with reference to the figures. FIG. 1 is a perspective view of the hydraulic excavator 100. In the following explanation, "front" and "rear" refer to the front and the rear of a vehicle body 1. In the following description, "right," "left," "up," and "down" indicate directions relative to a state of looking forward from the driver's seat, and "vehicle width direction" and "left-right direction" have the same meaning.

As illustrated in FIG. 1, the hydraulic excavator (example of a work vehicle) 100 includes the vehicle body 1 and work implement 4, and the work implement 4 is used for performing desired work.

The vehicle body 1 has an undercarriage 2 and a revolving body 3. The undercarriage 2 includes a pair of travel devices 2a, 2b. The travel device 2a has a crawler belt 2d and the travel device 2b has a crawler belt 2c. The travel devices 2a, 2b allow the hydraulic excavator 100 to travel due to the crawler belts 2c, 2d being driven by driving power from an engine 10.

The revolving body 3 is mounted on the undercarriage 2, and is provided in a manner that allows revolving in relation to the undercarriage 2. The revolving body 3 has an operating cabin 5, a fuel tank 6, an operating fluid tank 7, an engine room 8, and a counterweight 18.

The fuel tank 6 stores fuel for driving the engine 10 and is disposed in front of the operating fluid tank 7. The operating fluid tank 7 stores operating fluid. The operating fluid tank 7 is arranged in a line in the front-back direction with the fuel tank 6.

The engine room 8 houses equipment such as the engine 10, a hydraulic pump 11, an exhaust gas post-processing unit 20 and the like as described below. The engine room 8 is disposed to the rear of the operating cabin 5, the fuel tank 6, and the operating fluid tank 7. An engine hood 12 is disposed above the engine room 8. The counterweight 18 is disposed to the rear of the engine room 8.

The work implement 4 is attached at the front of the revolving body 3. The work implement 4 includes a boom 4a, an arm 4b, a bucket 4c, a pair of boom cylinders 4d, an arm cylinder 4e, and a bucket cylinder 4f. The proximal end of the boom 4a is coupled to the revolving body 3 in a rotatable manner. The proximal end of the arm 4b is coupled in a rotatable manner to the distal end of the boom 4a. The bucket 4c is coupled in a rotatable manner to the distal end of the arm 4b. The boom cylinders 4d, the arm cylinder 4e, and the bucket cylinder 4f are hydraulic cylinders and are driven by operating fluid discharged from the belowmentioned hydraulic pump 11. The boom cylinders 4d actuate the boom 4a. The arm cylinder 4e actuates the arm 4b. The bucket cylinder 4f actuates the bucket 4c. The driving of the cylinders 4d, 4e, and 4f drives the work implement 4.

Figure 2:
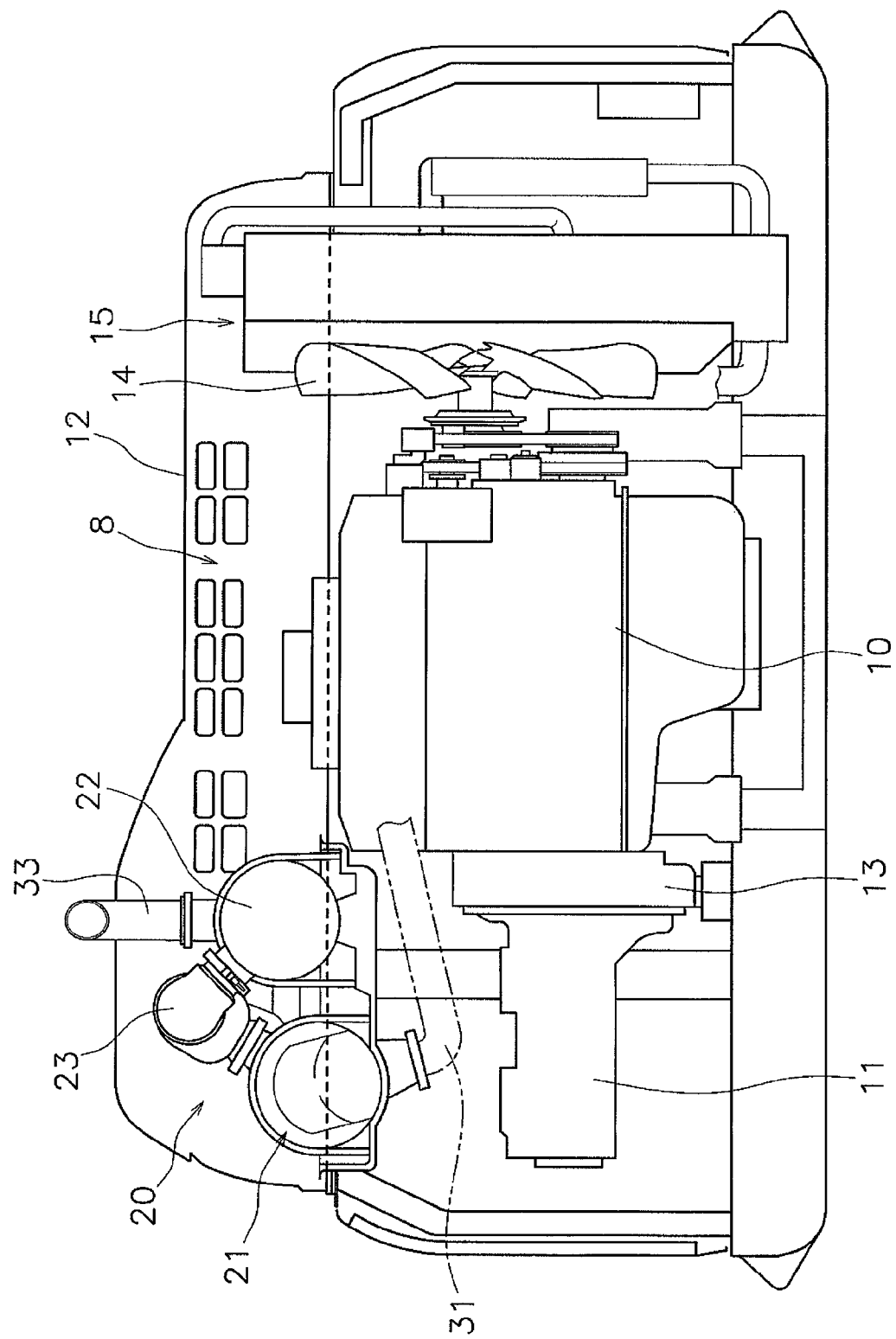
FIG. 2 is a back view an internal structure of an engine room.

FIG. 2 illustrates the internal structure of the engine room 8 as seen from the rear of the vehicle. As illustrated in FIG. 2, the engine 10, a flywheel housing 13, the hydraulic pump 11, the exhaust gas post-processing unit 20, a fan 14, and a radiator 15 are disposed in the engine room 8. The fan 14 produces an air current to be blown from the right to the left inside the engine room 8. The radiator 15 is disposed on the right side of the fan 14. Cooling air is introduced into the engine room 8 from outside through air vent holes 801 (see FIG. 1) when the fan 14 is operating. The cooling water flowing inside the radiator 15 is cooled by the cooling air. The engine 10, the flywheel housing 13, and the hydraulic pump 11 are disposed in a row in the vehicle width direction.

The hydraulic pump 11 is driven by the engine 10. The hydraulic pump 11 is disposed on the left side of the engine 10. The flywheel housing 13 is disposed between the engine 10 and the hydraulic pump 11. The flywheel housing 13 is attached to the left side surface the engine 10. The hydraulic pump 11 is attached to the left side surface the flywheel housing 13.

Figure 3:
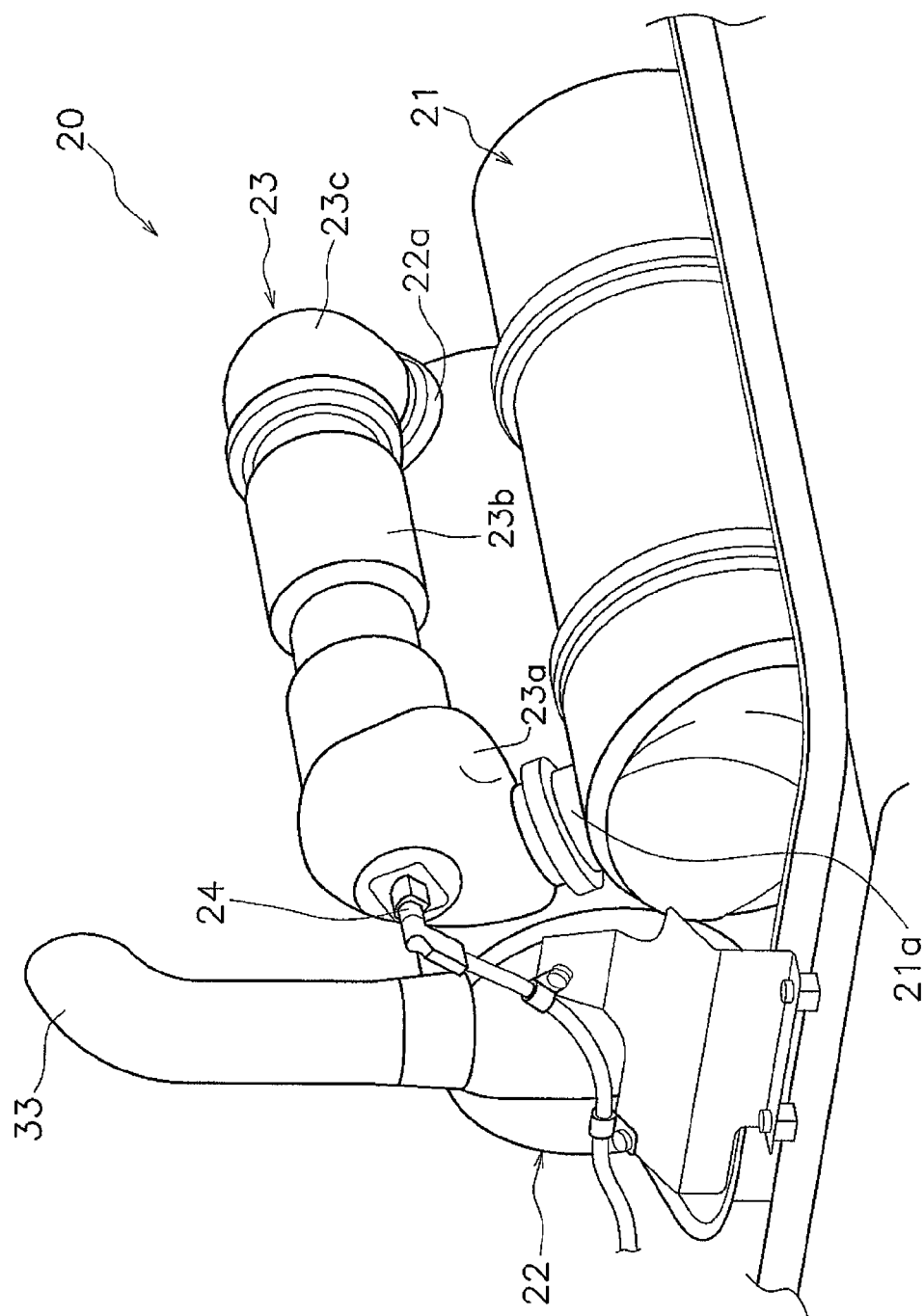
FIG. 3 is a perspective view of the exhaust gas post-processing unit.

FIG. 3 is a perspective view of the exhaust gas post-processing unit 20 as seen from the right front. As illustrated in FIGS. 2 and 3, the exhaust gas post-processing unit 20 treats exhaust from the engine 10. The exhaust gas post-processing unit 20 has a diesel particulate filtering device (DPF) 21, a selective catalyst reduction device (SCR) 22, a connecting pipe 23, and an injection device 24.

The diesel particulate filtering device 21 is a device for treating the exhaust gas from the engine 10. The exhaust gas is supplied from the engine 10 via a turbo charger (not illustrated) and a pipe 31. Specifically, the diesel particulate filtering device 21 is a device that collects, in a filter, particulate matter included in the exhaust gas. The diesel particulate filtering device 21 burns the collected particulate matter inside the diesel particulate filtering device 21. The diesel particulate filtering device 21 has a roughly cylindrical shape and is disposed so that the longitudinal direction thereof extends in the front-back direction.

The connecting pipe 23 is a pipe for connecting the diesel particulate filtering device 21 and the selective catalyst reduction device 22, and is disposed above the engine 10. The entire connecting pipe 23 is formed in an S-shape and includes a first bend section 23a, a linear section 23b, and a second bend section 23c. One end of the first bend section 23a is connected to an exhaust gas outlet 21a of the diesel particulate filtering device 21, and the other end of the first bend section 23a is connected to one end of the linear section 23b. One end of the second bend section 23c is connected to an exhaust gas inlet 22a of the selective catalyst reduction device 22, and the other end of the second bend section 23c is connected to the other end of the linear section 23b. The linear section 23b extends in the longitudinal direction of the connecting pipe 23 between the first bend section 23a and the second bend section 23c.

The injection device 24 is attached to the first bend section 23*a*. The injection device 24 is a device for injecting a reducing agent sucked up from a belowmentioned reducing agent tank 9 by a reducing agent pump 19, into the connecting pipe 23 in order to add the reducing agent to the exhaust gas flowing through the connecting pipe 23. The reducing agent in the present embodiment is urea water. The urea water mixed in the exhaust gas is hydrolyzed due to the heat of the exhaust gas to become ammonia, and the ammonia is fed with the exhaust gas through the connecting pipe 23 to the selective catalyst reduction device 22.

The selective catalyst reduction device 22 is a device for treating the exhaust gas from the engine 10. Specifically, the selective catalyst reduction device 22 reduces nitrogen oxide compounds with the ammonia obtained by the hydrolyzation of the urea. The selective catalyst reduction device 22 has a roughly cylindrical shape and is disposed so that the longitudinal direction thereof extends in the vehicle front-back direction. An exhaust pipe 33 is connected to the selective catalyst reduction device 22 and the exhaust pipe 33 projects upward from the engine hood 12. Exhaust gas treated by the exhaust gas post-processing unit 20 is discharged to the outside from the exhaust pipe 33.

The diesel particulate filtering device 21, the selective catalyst reduction device 22, the connecting pipe 23, and the injection device 24 are disposed above the engine 10. The diesel particulate filtering device 21, the connecting pipe 23, and the selective catalyst reduction device 22 are disposed parallel to each other. The diesel particulate filtering device 21 and the selective catalyst reduction device 22 are disposed near each other and the longitudinal directions thereof are disposed in a row orthogonal to the vehicle width direction. The engine 10, the selective catalyst reduction device 22, the connecting pipe 23, and the diesel particulate filtering device 21 are disposed in order from the vehicle width direction right side.

Figure 4:
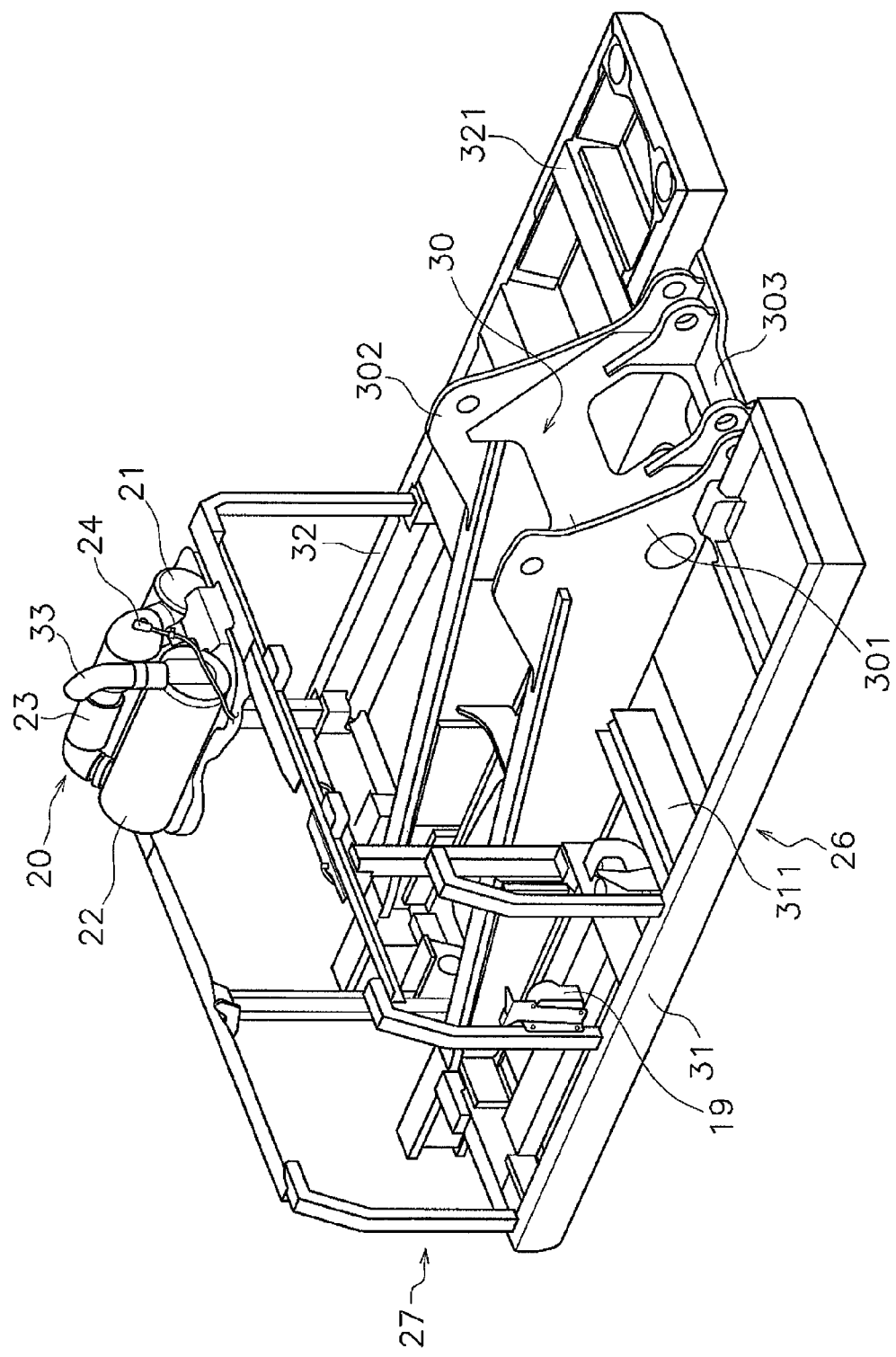
FIG. 4 is a perspective view of a frame structure of the hydraulic excavator.

FIG. 4 is a perspective view of a frame structure of the hydraulic excavator 100 seen from the right front. As illustrated in FIG. 4, the hydraulic excavator 100 includes a revolving frame 26 and a vehicle body frame 27.

The revolving frame 26 supports the engine 10 through a mounting member such as a rubber damper. The revolving frame 26 has a center frame 30, a first frame 31, and a second frame 32. The center frame 30 extends in the front-back direction of the vehicle. The engine 10 is disposed on a rear part of the center frame 30. The center frame 30 has a first center frame 301 and a second center frame 302. The first center frame 301 and the second center frame 302 are disposed away from each other in the vehicle width direction. The first center frame 301 and the second center frame 302 are plate-like members that respectively extend in the vehicle front-back direction and in the vertical direction. The center frame 30 has a bottom plate 303. The first center frame 301 and the second center frame 302 are linked together by the bottom plate 303.

The first frame 31 is disposed one side in the vehicle width direction relative to the center frame 30. The second frame 32 is disposed the other side in the vehicle width direction relative to the center frame 30. In the present embodiment, the first frame 31 is disposed to the right of the center frame 30. The second frame 32 is disposed to the left of the center frame 30.

The first frame 31 has a shape that extends in the front-back direction of the vehicle. The first frame 31 is disposed away from the center frame 30 in the vehicle width direction. The first frame 31 and the center frame 30 are linked together by a plurality of beam members 311. Only a portion of the beam members are given the reference numeral 311 in the drawings.

The second frame 32 has a shape that extends in the front-back direction of the vehicle. The second frame 32 is disposed away from the center frame 30 in the vehicle width direction. The second frame 32 and the center frame 30 are linked together by a plurality of beam members 321. Only a portion of the beam members are given the reference numeral 321 in the drawings.

The vehicle body frame 27 is provided on the rotating frame 26 in a standing manner. The vehicle body frame 27 is arranged around equipment such as the engine 10 and the hydraulic pump 11 and the like. The abovementioned exhaust processing device 24 is attached to the vehicle body frame 27.

Figure 5:
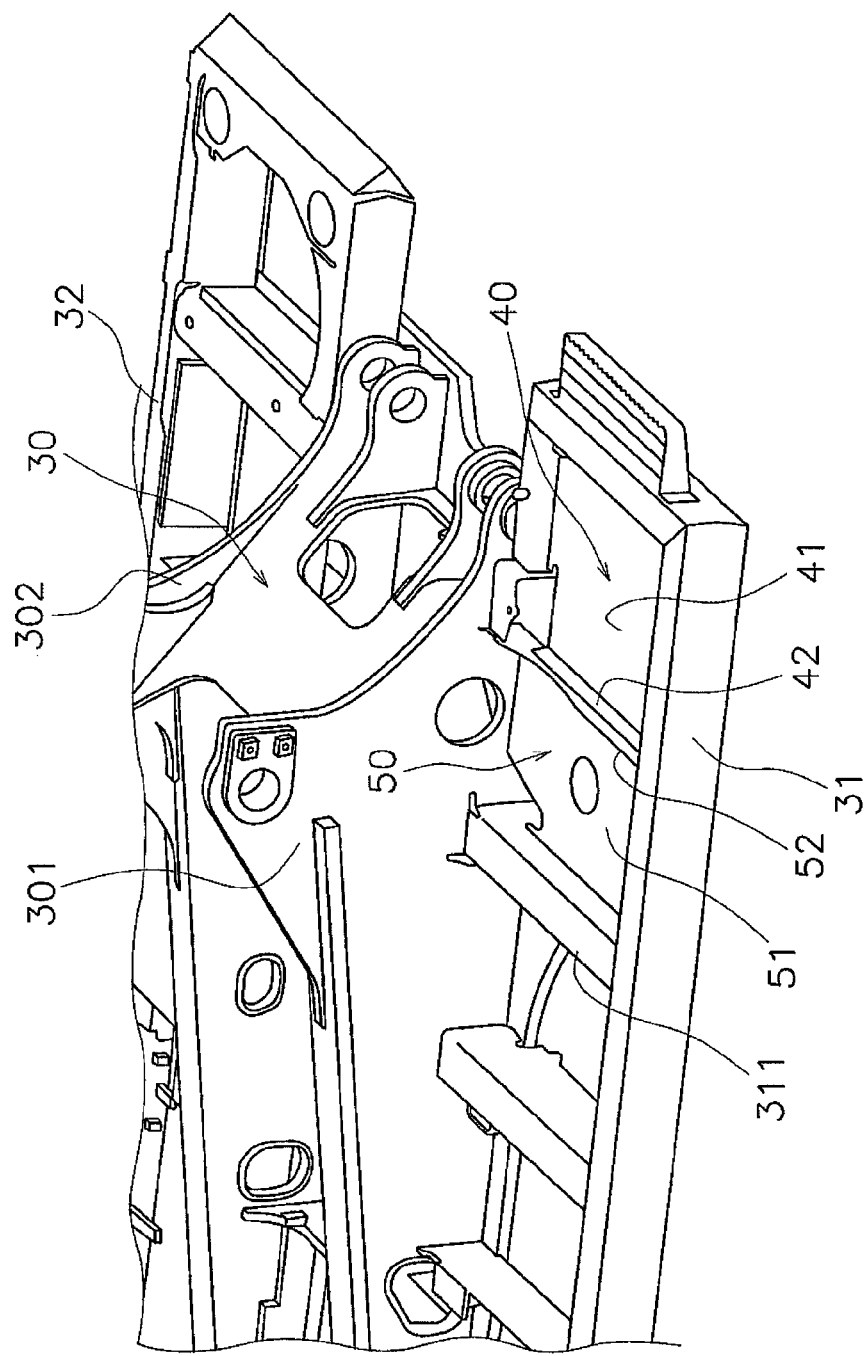
FIG. 5 is a partial perspective view of a detail of the frame structure of the hydraulic excavator.

FIG. 5 is a partial perspective view of a detail of the frame structure of the hydraulic excavator 100 seen from the right front. As illustrated in FIG. 5, a battery mounting member 40 is installed in a right front part of the revolving frame 26. The battery mounting member 40 is a member for mounting a battery 17 (see FIG. 6). Specifically, the battery mounting member 40 has a bottom plate 41 and a rear plate 42.

The bottom plate 41 has a rectangular shape and the right edge thereof is fixed to the first frame 31 by welding and the like. The battery 17 (see FIG. 6) is fixed onto the bottom plate 41 by mounting brackets and the like. The rear plate 42 extends upward from the rear edge of the bottom plate 41. The right edge of the rear plate 42 is fixed to the first frame 31 by welding and the like.

A reducing agent tank mounting member 50 is installed to the rear of the battery mounting member 40 and adjacent to the battery mounting member 40. The reducing agent tank mounting member 50 is a member for mounting the reducing agent tank 9 (see FIG. 6). The reducing agent tank mounting member 50 has a bottom plate 51 and a partition plate 52.

The bottom plate 51 of the reducing agent tank mounting member 50 has a rectangular shape and has an opening near the center. The left edge of the bottom plate 51 is fixed to the center frame 30 by welding and the like, and the right edge of the bottom plate 51 is fixed to the first frame 31 by welding and the like. The reducing agent tank 9 is fixed onto the bottom plate 51 by mounting brackets and the like.

The partition plate 52 of the reducing agent tank mounting member 50 is positioned between the reducing agent tank 9 and the battery 17. Specifically, the partition plate 52 extends upward from the front edge of the bottom plate 51. The partition plate 52 is a plate-like portion that extends vertical direction and extends in the vehicle width direction. The left edge of the partition plate 52 is fixed to the center frame 30 by welding and the like, and the right edge of the partition plate 52 is fixed to the first frame 31 by welding and the like. The front surface of the partition plate 52 abuts the rear surface of the rear plate 42 of the battery mounting member 40. The partition plate 52 extends upward further than the rear plate 42.

Figure 6:
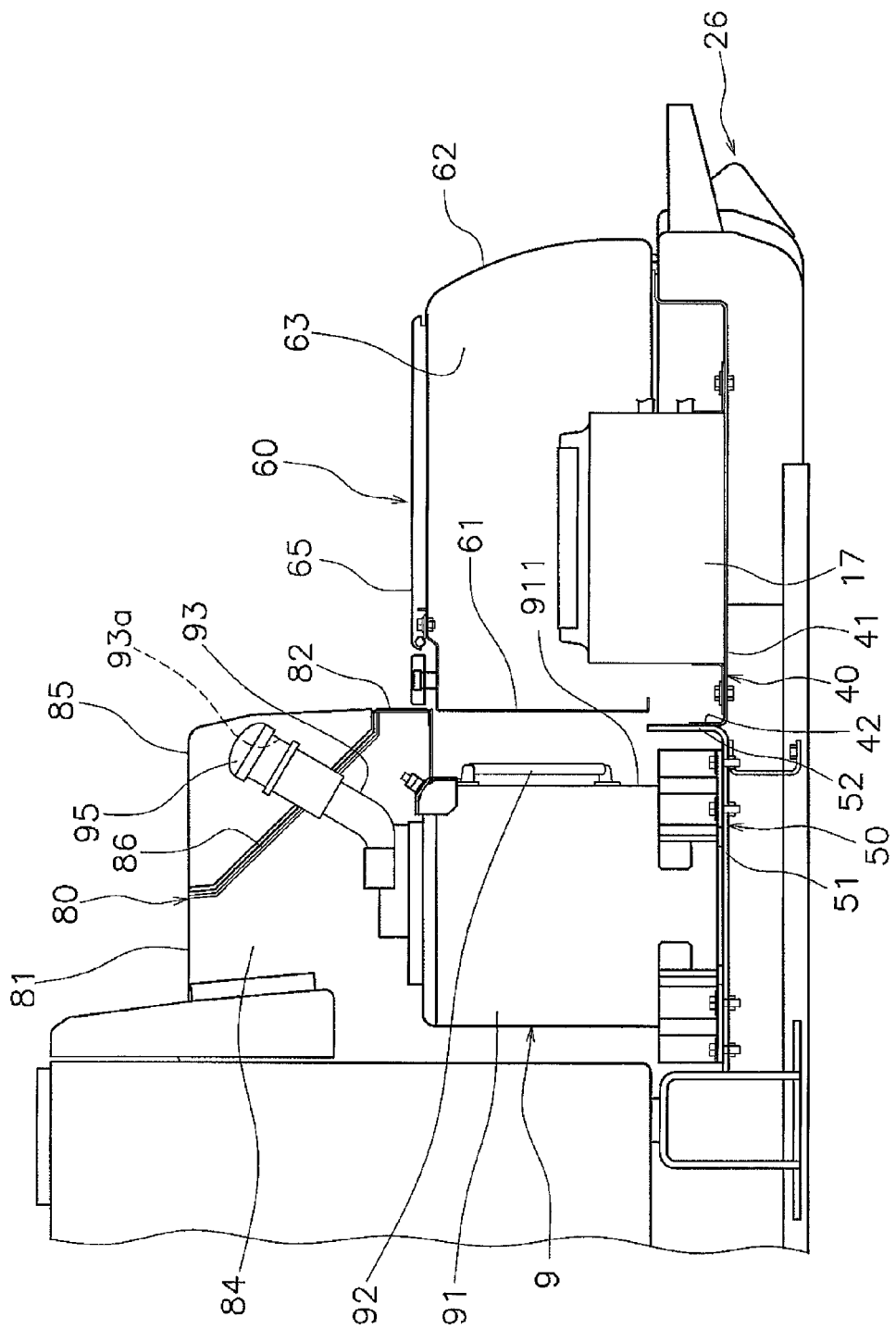
FIG. 6 is a side cross-sectional view of a right front part of a vehicle body.

FIG. 6 is a side cross-sectional view of a right front part of the vehicle body 1. As illustrated in FIG. 6, a battery cover 60 is fixed in a removable manner to the revolving frame 26 to cover the battery 17 that is fixed to the battery mounting member 40. The battery cover 60 is substantially formed in a rectangular solid shape and is open at the bottom surface. Specifically, the battery cover 60 has an upper plate (example of a work plate) 65, a rear plate 61, a front plate 62, a left plate 63, and a right plate 64 (see FIG. 1).

The upper plate 65 has a rectangular shape and is positioned at a front side (example of a first side) of the reducing agent tank 9. The upper plate 65 and the reducing agent tank 9 are positioned in a row as seen in a plan view. The upper plate 65 is positioned higher than a belowmentioned gauge member 92 of the reducing agent tank 9. The rear plate 61 extends downward from the rear edge of the upper plate 65 and is positioned between the reducing agent tank 9 and the battery 17. Specifically, the rear plate 61 is positioned to the rear of the battery 17.

The front plate 62 extends downward from the front edge of the upper plate 65, the left plate 63 extends downward from the left edge of the upper plate 65, and the right plate 64 extends downward from the right edge of the upper plate 65. The front plate 62, the left plate 63, and the right plate 64 are attached in a removable manner directly or indirectly to the revolving frame 26 whereby the battery cover 60 is attached to the revolving frame 26 in a removable manner.

The rear plate 61 is not attached to the revolving frame 26. Specifically, a lower end part of the rear plate 61 is positioned above the battery mounting member 40 without touching the battery mounting member 40. That is, a gap is formed between the lower end of the rear plate 61 and the battery mounting member 40. The rear plate 61 is positioned further forward than the rear plate 42 of the battery mounting member 40. Specifically, the rear plate 61 is positioned between the battery 17 and the rear plate 42 in the front-back direction.

Figure 7:
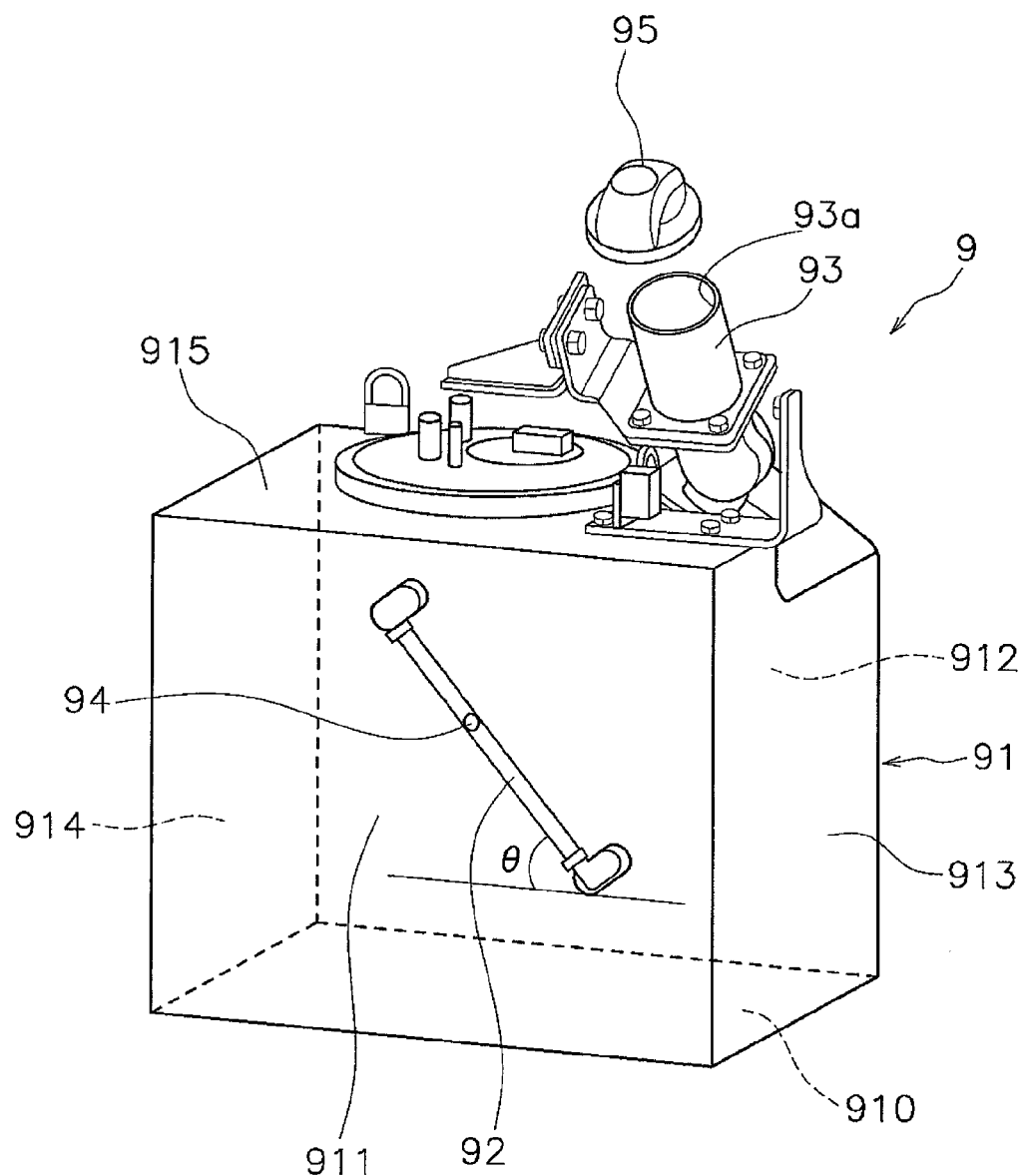
FIG. 7 is a perspective view of a reducing agent tank.

The reducing agent tank 9 for storing the reducing agent is installed on the reducing agent tank mounting member 50. FIG. 7 is a perspective view of the reducing agent tank 9. FIG. 7 depicts a state in which a lid 95 is removed. As illustrated in FIG. 7, the reducing agent tank 9 is provided with a tank body 91, the gauge member 92, a guiding tube 93, and a floating member 94. The reducing agent tank 9 is connected to the reducing agent pump 19 via a reducing agent pipe (not illustrated), and the reducing agent pump 19 is connected to the injection device 24 via another reducing agent pipe (not illustrated).

The tank body 91 has a substantially rectangular solid shape and stores the reducing agent therein. Specifically, the tank body 91 has a bottom plate 910, first to fourth side plates 911 to 914, and an upper plate 915. The bottom plate 910 extends in a horizontal direction when the reducing agent tank 9 is placed horizontally with the bottom plate 910 at the bottom.

The first to fourth side plates 911 to 914 extend upward from the edges of the bottom plate 910. The first side plate 911 and the second side plate 912 face each other, and the third side plate 913 and the fourth side plate 914 face each other. The first and second side plates 911 and 912 have a greater width, that is, are longer in the horizontal direction, than the third and fourth side plates 913 and 914. The outside surface (example of a first wall surface) of the first side plate 911 faces a first side. In the present embodiment, the outside surface of the first side plate 911 faces toward the front when the reducing agent tank 9 is mounted on the reducing agent tank mounting member 50. The X-direction in FIG. 7 is the direction that faces the first side.

The guiding tube 93 extends upward from the upper plate 915 and extends to the first side. The guiding tube 93 has a cylindrical shape. A replenishing port 93a is formed on a distal end part of the guiding tube 93. At least a portion of the replenishing port 93a is positioned on the first side further to the outside than the first side plate 911 (see FIG. 6). The lid 95 for sealing the replenishing port 93a is attached in a detachable manner to the distal end part of the guiding tube 93. When replenishing reducing agent into the tank body 91, the lid 95 is removed and the reducing agent is poured into the tank body 91 via the guiding tube 93. The replenishing port 93a is positioned higher than the upper plate 65 of a battery cover 60.

The gauge member 92 is attached to the outside surface of the first side plate 911 of the tank body 91. Specifically, the gauge member 92 is attached to the tank body 91 on the first side of the tank body 91. The gauge member is provided so as to project outward. The direction in which the gauge member projects is to the first side, that is, toward the front. The gauge member 92 is a member for visually confirming an amount of reducing agent inside the tank body 91. The gauge member 92 is a linear cylindrical member and is substantially parallel to the first side plate 911. The gauge member 92 is slanted with respect to the bottom plate 910 of the tank body 91 as seen from the first side. Specifically, the gauge member 92 is slanted with respect to the bottom plate 910 of the tank body 91 in a state in which the outside surface of the first side plate 911 of the tank body 91 is seen from the front.

The gauge member 92 is positioned in the center part in the width direction of the tank body 91 as seen from the first side. The replenishing port 93a is positioned at an end part of the tank body 91 as seen in a plan view. The replenishing port 93a and the gauge member 92 are disposed in a row in a direction along the outside surface of the first side plate 911 when seen in a plan view (see FIG. 9). That is, the gauge member 92 and the replenishing port 93a are positioned within the same region in the front-back direction of the vehicle (see FIG. 6). More specifically, the replenishing port 93a is positioned above the gauge member 92 as seen in a side view (in a state as seen from the horizontal direction and from a direction orthogonal to the direction seen from the first side).

The gauge member 92 communicates with the tank body 91 at an upper end part and a lower end part. The gauge member 92 communicates with the tank body 91 via the upper end part and via the lower end part. As a result, when the liquid level of the reducing agent inside the tank body 91 is positioned above the lower end part of the gauge member 92, the reducing agent inside the tank body 91 is supplied into the gauge member 92 through the lower end part of the gauge member 92. That is, the position of the liquid level of the reducing agent inside the gauge member 92 is substantially the same as the position of the liquid level of the reducing agent inside the tank body 91.

The upper end of the gauge member 92 is positioned lower than an upper end of the tank body 91. That is, the upper end of the gauge member 92 is positioned in a clearance below the upper end of the tank body 91.

A floating member 94 is housed inside the gauge member 92. The floating member 94 is a member for confirming the liquid level of the reducing agent inside the gauge member 92 and is configured to float on the reducing agent. The floating member 94 is able to move in the length direction of the gauge member 92 inside the gauge member 92.

A tank cover 80 is attached to cover the reducing agent tank 9 as illustrated in FIG. 6. The tank cover 80 is supported by a plurality of pillar parts that extend upward from the revolving frame 26.

The tank cover 80 has an upper plate 81, a front plate 82, a right plate 83 (see FIG. 1), a left plate 84, and an opening and closing part 85. The upper plate 81 is positioned above the reducing agent tank 9. The front plate 82 is a plate-like member that extends in the vertical direction and the vehicle width direction, and is positioned approximately directly above the rear plate 61 of the battery cover 60. The right plate 83 is positioned to the right of the reducing agent tank 9, and the left plate 84 is positioned to the left of the reducing agent tank 9. An opening 86 that straddles the upper plate 81 and the front plate 82 is formed and the opening 86 is blocked by the opening and closing part 85. The opening and closing part 85 is attached to the upper plate 81 in a manner that allows opening and closing. Specifically, the opening and closing part 85 is attached to the upper plate 81 via hinges and the opening 86 can be opened or closed. The tank cover 80 and the upper plate 65 of the battery cover 60 are formed in a step-like manner as a whole. Specifically, the upper plate 65 of the battery cover 60 extends forward from the front plate 82 of the tank cover 80. While a gap is formed between the upper plate 65 of the battery cover 60 and the front plate 82 of the tank cover 80, the present invention is not limited as such.

Figure 8:
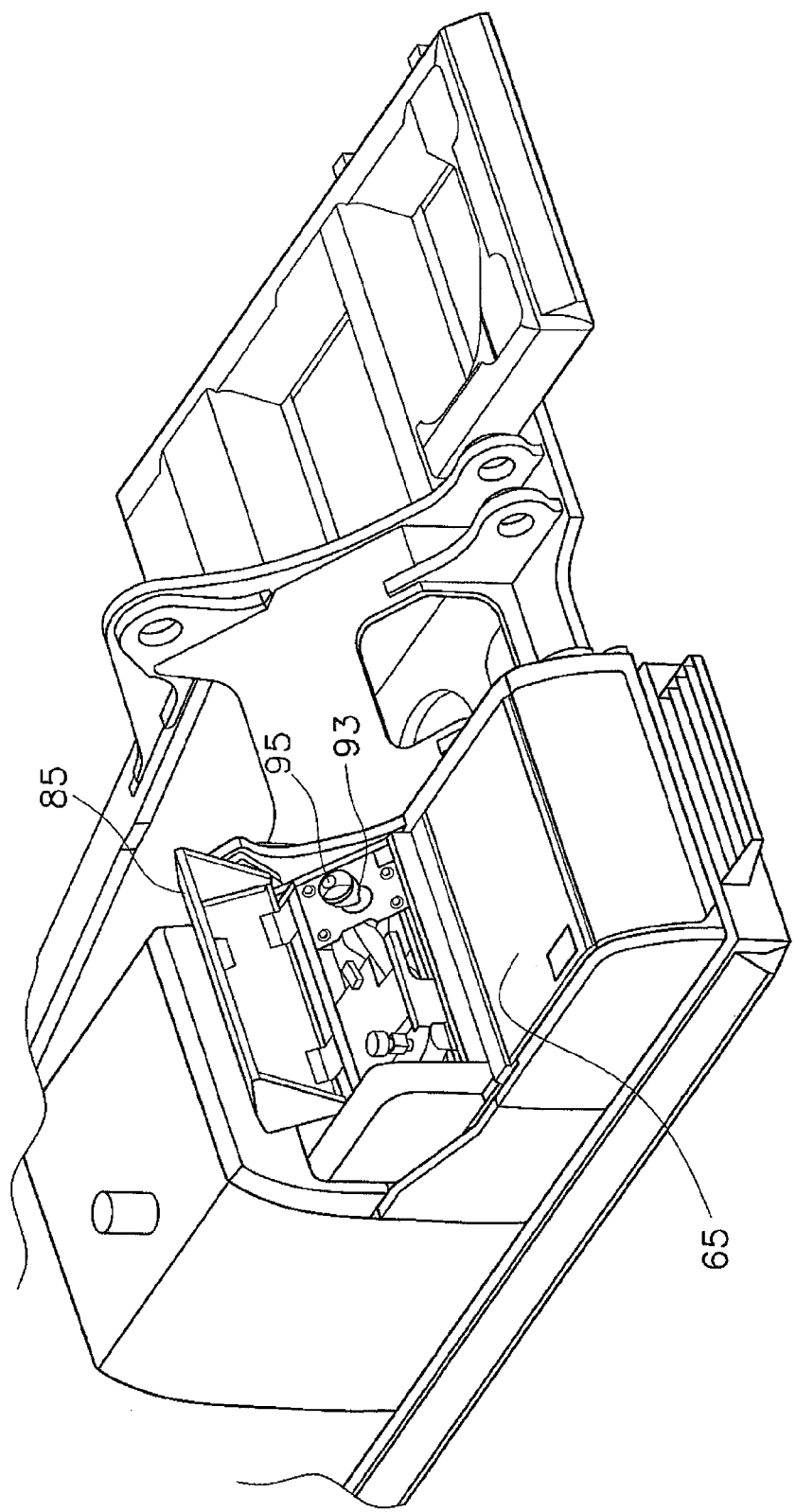
FIG. 8 is a partial perspective view of the hydraulic excavator while an opening and closing part is open.
Figure 9:
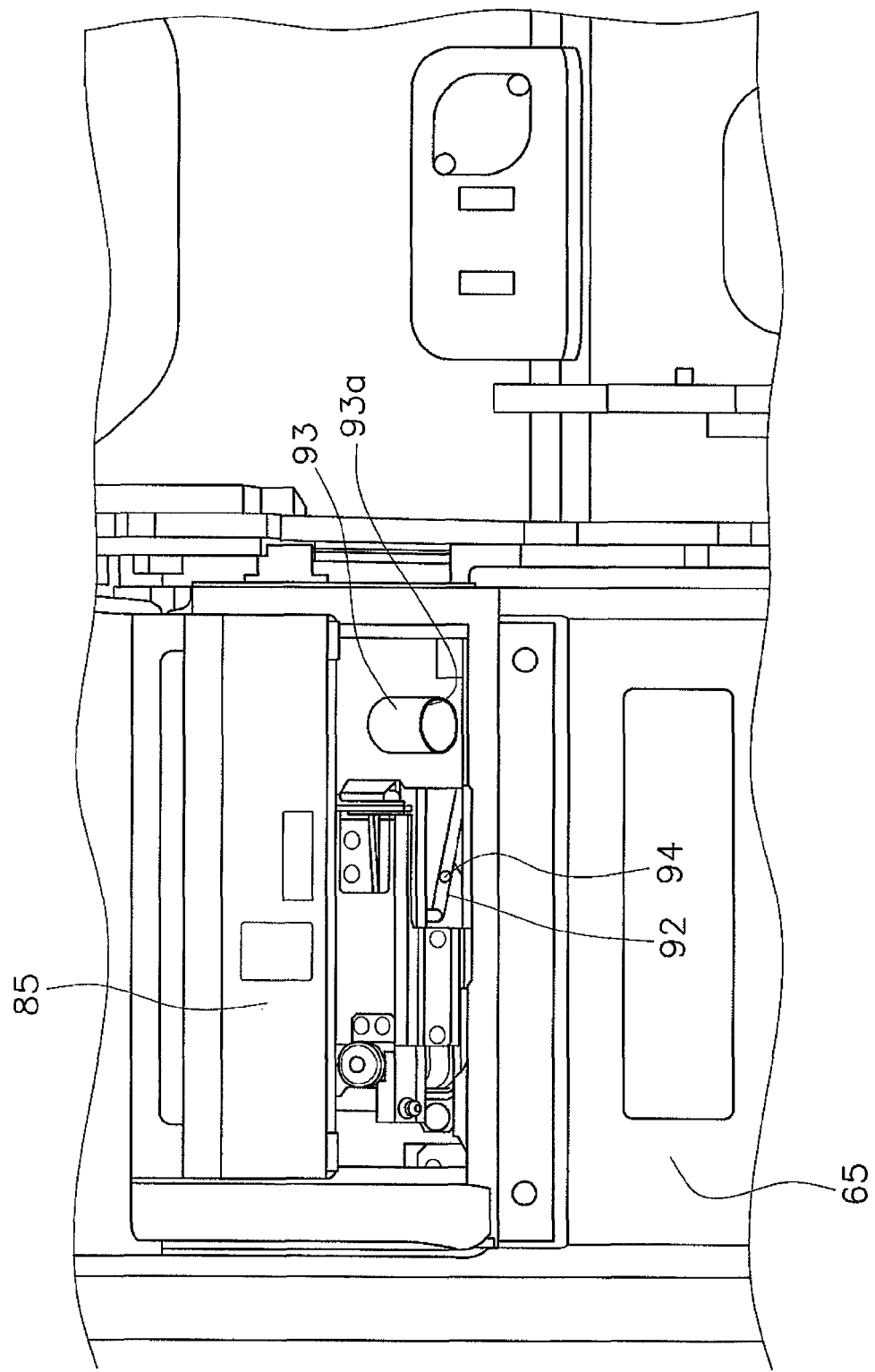
FIG. 9 is a partial plan view of the hydraulic excavator while the opening and closing part is open.

When replenishing the reducing agent tank 9 with the reducing agent in the hydraulic excavator 100 configured as described above, first a replenishing container containing the reducing agent for replenishing is placed on the upper plate 65 of the battery cover 60. The operator stands on the upper plate 65 of the battery cover 60 to perform the replenishing work. Next, the operator opens the opening and closing part 85 of the tank cover 80 to expose the guiding tube 93 of the reducing agent tank 9 as illustrated in FIG. 8. The operator then removes the lid 95 to pour the reducing agent from the replenishment container into the reducing agent tank 9. FIG. 9 illustrates a state when seeing the reducing agent tank 9 from above with the opening and closing part 85 of the tank cover 80 open. As illustrated in FIG. 9, the gauge member 92 and the replenishing port 93a can be seen from the gap formed by opening the opening and closing part 85 since the gauge member 92 and the replenishing port 93a are disposed in a row in the direction (the vehicle width direction in the present embodiment) along the outside surface of the first side plate 911 of the tank body 91 as seen in a plan view. The opening and closing part 85 is opened and closed by rotation around an axis that extends along the outside surface of the first side plate 911 as seen in a plan view.

(Characteristics)

The hydraulic excavator 100 according to the present embodiment has the following features.

The amount of reducing agent inside the tank body 91 may be confirmed by looking at the liquid level of the reducing agent inside the gauge member 92 since the gauge member 92 communicates with the inside of the tank body 91. Since the gauge member 92 is slanted with respect to the bottom plate 910 as seen from the first side, the liquid level position of the reducing agent inside the gauge member 92 may be confirmed even when looking at the gauge member 92 from above as illustrated in FIG. 9. That is, an operator standing on the upper plate 65 of the battery cover 60 is able to confirm the liquid level position of the reducing agent inside the gauge member 92. The liquid level position of the reducing agent can be confirmed by the floating member 94 in the above embodiment. As a result, the amount of reducing agent inside the reducing agent tank 9 may be visually confirmed in a simple manner when replenishing the reducing agent. Since the replenishing port 93a and the gauge member 92 are disposed in a row in a direction along the outside surface of the first side plate 911 when seen in a plan view, the reducing agent can be replenished while confirming the amount of the reducing agent.

Since the guiding tube 93 extends toward the first side, the operator performing the replenishing work is able to perform the replenishing work while in a position of easily checking the gauge member 92 in a visual manner.

The upper end of the gauge member 92 is positioned lower than an upper end of the tank body 91, that is, a clearance is provided between the upper end of the tank body 91 and the upper end of the gauge member 92. As a result, even if the reducing agent is replenished until the liquid level of the reducing agent reaches the upper end of the gauge member 92, a space remains in the upper end portion inside the tank body 91. While the volume of the reducing agent increases when the reducing agent inside the reducing agent tank freezes in a cold district, damage to the tank body 91 due to a volume expansion of the reducing agent may be prevented since the space inside the tank body 91 is provided as described above.

The first side plate 911 to which the gauge member 92 is attached is relatively wider than the third and fourth side plates 913 and 914. As a result, a sloping angle θ of the gauge member 92 can be reduced. That is, the gauge member 92 is able to be slanted further from the vertical direction. As a result, the amount of reducing agent inside the tank body 91 can be confirmed more accurately when visually checking the gauge member 92 from above.

MODIFIED EXAMPLES

While an embodiment of the present invention has been described above, the present invention is not limited to the embodiment and the following modifications may be made within the scope of the present invention.

Modified Example 1

While the floating member 94 is housed inside the gauge member 92 in the above embodiment, the present invention is not limited as such and the floating member 94 may be omitted. In this case, the liquid level of the reducing agent inside the gauge member 92 is confirmed visually.

Modified Example 2

While the first side to which the gauge member 92 is attached is front side, that is, the first side plate 911 of the tank body 91 faces the front in a state in which the reducing agent tank 9 is mounted on the reducing agent tank mounting member 50, the present invention is not limited as such. For example, the first side plate 911 of the tank body 91 may face the left side in a state in which the reducing agent tank 9 is mounted on the reducing agent tank mounting member 50. In this case, a work plate for allowing the operator to stand while preforming the replenishing work is preferably provided on the left side of the reducing agent tank 9.

Modified Example 3

While an example of a hydraulic excavator applicable to the present invention has been described in the above embodiment, the work vehicle applicable to the present invention is not limited to a hydraulic excavator. For example, a bulldozer, a wheel loader, or a motor grader and the like may be applied to the present invention.

What is claimed is:

1. A reducing agent tank comprising:
a tank body configured to store a reducing agent; and
a cylindrical gauge member configured to visually indicate a storage amount of the reducing agent inside the tank body, the gauge member being in communication with an inside of the tank body,
the tank body having a replenishment port configured to replenish the reducing agent,
the gauge member being provided on a first wall surface of a plurality of wall surfaces defining the tank body, and the gauge member being provided in a slanted manner relative to a bottom plate of the tank body, and the replenishing port and the gauge member being disposed in a row along a direction that extends along the first wall surface as seen in a plan view, the entire gauge member is disposed closer to the bottom plate than any portion of the replenishing port.

2. The reducing agent tank according to claim 1, wherein an upper end of the gauge member is positioned lower than an upper end of the tank body.

3. A work vehicle including the reducing agent tank described in claim 2, the work vehicle further comprising:
a work plate positioned outside of the first wall surface,
the work plate being positioned higher than the gauge member and lower than the replenishing port.

4. The work vehicle according to claim 3, wherein the reducing agent tank and the work plate are disposed in a row as seen in the plan view.

5. A work vehicle including the reducing agent tank described in claim 1, the work vehicle further comprising:
a work plate positioned outside of the first wall surface,
the work plate being positioned higher than the gauge member and lower than the replenishing port.

6. The work vehicle according to claim 5, wherein the reducing agent tank and the work plate are disposed in a row as seen in the plan view.

7. The work vehicle according to claim 6, further comprising:
a tank cover disposed above the reducing agent tank so as to cover the reducing agent tank,
the tank cover and the work plate being formed in a stepped manner as a whole.

8. The work vehicle according to claim 5, further comprising:
a tank cover disposed above the reducing agent tank so as to cover the reducing agent tank,
the tank cover and the work plate being formed in a stepped manner as a whole.

9. The reducing agent tank according to claim 1, wherein the first wall surface is perpendicular to the bottom plate, and
the gauge member is arranged parallel to the first wall surface.

10. A reducing agent tank comprising:
a tank body configured to store a reducing agent, the tank body having a replenishment port configured to replenish the reducing agent; and
a cylindrical gauge member configured to visually indicate a storage amount of the reducing agent inside the tank body, the gauge member being in communication with an inside of the tank body, the gauge member being provided on a first wall surface of a plurality of wall surfaces defining the tank body, and the gauge member being provided in a slanted manner relative to a bottom plate of the tank body,
the replenishing port being positioned at an end part side of the tank body along a width direction of the first wall surface as seen in a plan view, and
the gauge member being arranged such that a first end of the gauge member is disposed closer to the replenishing port than a second end of the gauge member along the width direction of the first wall surface in the plan view.

11. The reducing agent tank according to claim 10, further comprising:
a guiding tube configured to guide the reducing agent from the replenishing port into the tank body,
the gauge member being provided in a manner that projects in an outward direction from the first wall surface; and
the guiding tube extending upward from an upper surface of the tank body and extending in the outward direction in which the gauge member projects.

12. The reducing agent tank according to claim 10, wherein an upper end of the gauge member is positioned lower than an upper end of the tank body.

13. A work vehicle including the reducing agent tank described in claim 10, the work vehicle further comprising:
a work plate positioned outside of the first wall surface,
the work plate being positioned higher than the gauge member and lower than the replenishing port.

14. The work vehicle according to claim 13, wherein the reducing agent tank and the work plate are disposed in a row as seen in the plan view.

15. The reducing agent tank according to claim 10, wherein the second end of the gauge member is arranged farther from the bottom plate of the tank body than the first end of the gauge member.

16. A reducing agent tank comprising:
a tank body configured to store a reducing agent, the tank body having a replenishment port configured to replenish the reducing agent;
a cylindrical gauge member configured to visually indicate a storage amount of the reducing agent inside the tank body, the gauge member being in communication with an inside of the tank body, the gauge member being provided on a first wall surface of a plurality of wall surfaces defining the tank body such that the gauge member projects in an outward direction from the first wall surface, and the gauge member being provided in a slanted manner relative to a bottom plate of the tank body; and
a guiding tube configured to guide the reducing agent from the replenishing port into the tank body, the guiding tube extending upward from an upper surface of the tank body and extending in the outward direction in which the gauge member projects, the guiding tube and the gauge member extending in intersecting directions in a plan view.

17. The reducing agent tank according to claim 16, wherein an upper end of the gauge member is positioned lower than an upper end of the tank body.

18. A work vehicle including the reducing agent tank described in claim 16, the work vehicle further comprising:
a work plate positioned outside of the first wall surface,
the work plate being positioned higher than the gauge member and lower than the replenishing port.

19. The work vehicle according to claim 18, wherein the reducing agent tank and the work plate are disposed in a row as seen in the plan view.

20. The reducing agent tank according to claim 16, wherein the first wall surface is perpendicular to the bottom plate, and
the gauge member is arranged parallel to the first wall surface.

* * * * *